(12) United States Patent
Eng et al.

(10) Patent No.: US 12,581,171 B2
(45) Date of Patent: Mar. 17, 2026

(54) MANAGING CONTENT DATA

(71) Applicant: Comcast Cable Communications, LLC, Philadelphia, PA (US)

(72) Inventors: Adam D. Eng, Golden, CO (US); David A. Eng, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/792,911

(22) Filed: Aug. 2, 2024

(65) Prior Publication Data

US 2026/0039927 A1     Feb. 5, 2026

(51) Int. Cl.
*H04N 21/84* (2011.01)

(52) U.S. Cl.
CPC ................................... *H04N 21/84* (2013.01)

(58) Field of Classification Search
CPC ....................................................... H04N 21/84
See application file for complete search history.

(56) References Cited

U.S. PATENT DOCUMENTS

| | | | | |
|---|---|---|---|---|
| 8,769,557 B1* | 7/2014 | Terrazas | ........... | H04N 21/44218 725/12 |
| 10,257,547 B1* | 4/2019 | Yan | ................... | H04N 21/47217 |
| 11,317,154 B1* | 4/2022 | Richter | .............. | H04N 21/4126 |
| 2010/0095317 A1* | 4/2010 | Toebes | ................. | H04N 21/466 725/9 |

| | | | | |
|---|---|---|---|---|
| 2011/0008017 A1 | 1/2011 | Gausereide | | |
| 2013/0205314 A1* | 8/2013 | Ramaswamy | ......... | H04H 60/33 725/14 |
| 2013/0247081 A1* | 9/2013 | Vinson | ................. | H04N 21/254 725/14 |
| 2013/0297706 A1* | 11/2013 | Arme | ................. | H04N 21/8455 709/206 |
| 2014/0108309 A1* | 4/2014 | Frank | ..................... | G06Q 50/01 706/12 |
| 2014/0223480 A1* | 8/2014 | Berry | ................. | H04N 21/4826 725/40 |
| 2015/0033266 A1* | 1/2015 | Klappert | ............ | H04N 21/4314 725/52 |
| 2015/0189355 A1* | 7/2015 | Korbecki | .............. | B33Y 50/02 725/12 |
| 2015/0189377 A1* | 7/2015 | Wheatley | ......... | H04N 21/44218 725/12 |
| 2015/0195616 A1* | 7/2015 | Espinosa | ................ | H04N 21/84 725/93 |
| 2016/0191999 A1* | 6/2016 | Friedrich | .......... | H04N 21/4821 725/39 |
| 2017/0295389 A1* | 10/2017 | Crist | .................. | H04N 21/4583 |
| 2018/0220198 A1* | 8/2018 | Matthews | ........ | H04N 21/25883 |
| 2018/0367860 A1* | 12/2018 | Schmidt | ............ | H04N 21/4755 |
| 2020/0304844 A1* | 9/2020 | Kumar | ................... | H04N 21/84 |

(Continued)

FOREIGN PATENT DOCUMENTS

| | | | | | |
|---|---|---|---|---|---|
| WO | WO-2008020171 A2 | * | 2/2008 | ....... | H04N 21/43074 |
| WO | WO-2013166411 A1 | * | 11/2013 | ............. | H04N 21/84 |
| WO | WO-2014134801 A1 | * | 9/2014 | ....... | H04N 21/43074 |

*Primary Examiner* — Fernando Alcon

(74) *Attorney, Agent, or Firm* — Banner & Witcoff, Ltd.

(57) ABSTRACT

Proper descriptive data control within content may be needed, for example to prevent a spoiler. By properly managing descriptive data, viewers may receive relevant information at the correct moment. This approach may foster a more personalized viewing experience.

20 Claims, 10 Drawing Sheets

300

301

302 — Title: Psycho

303 — Actor: Anthony Perkins

304 — Character: Norman Bates, portrayed by Anthony Perkins, disguises as his mother to commit murder

(56) References Cited

U.S. PATENT DOCUMENTS

| | | | |
|---|---|---|---|
| 2020/0404372 A1* | 12/2020 | Di Loreto | H04N 21/44204 |
| 2021/0352382 A1* | 11/2021 | Channapragada | H04N 21/4312 |
| 2021/0374179 A1* | 12/2021 | Aher | G06F 16/739 |
| 2022/0167068 A1* | 5/2022 | Zavesky | H04N 21/8133 |
| 2023/0034050 A1* | 2/2023 | Gupta | H04N 21/4316 |
| 2023/0132764 A1* | 5/2023 | Channapragada | H04N 21/4316 |
| | | | 386/241 |
| 2023/0244717 A1* | 8/2023 | Chundi | H04N 21/812 |
| | | | 707/736 |
| 2024/0414403 A1* | 12/2024 | Holland | H04N 21/482 |

* cited by examiner

300

301

Title: Psycho

Actor: Anthony Perkins

Character: Norman Bates, portrayed by Anthony Perkins, disguises as his mother to commit murder

302

303

304

Integrate a score and descriptive data
501

Specify the highest score
502

Facilitate user interaction
503

Use guidelines
601

Integrate third-party descriptive data
602

Monitor the third-party descriptive data
603

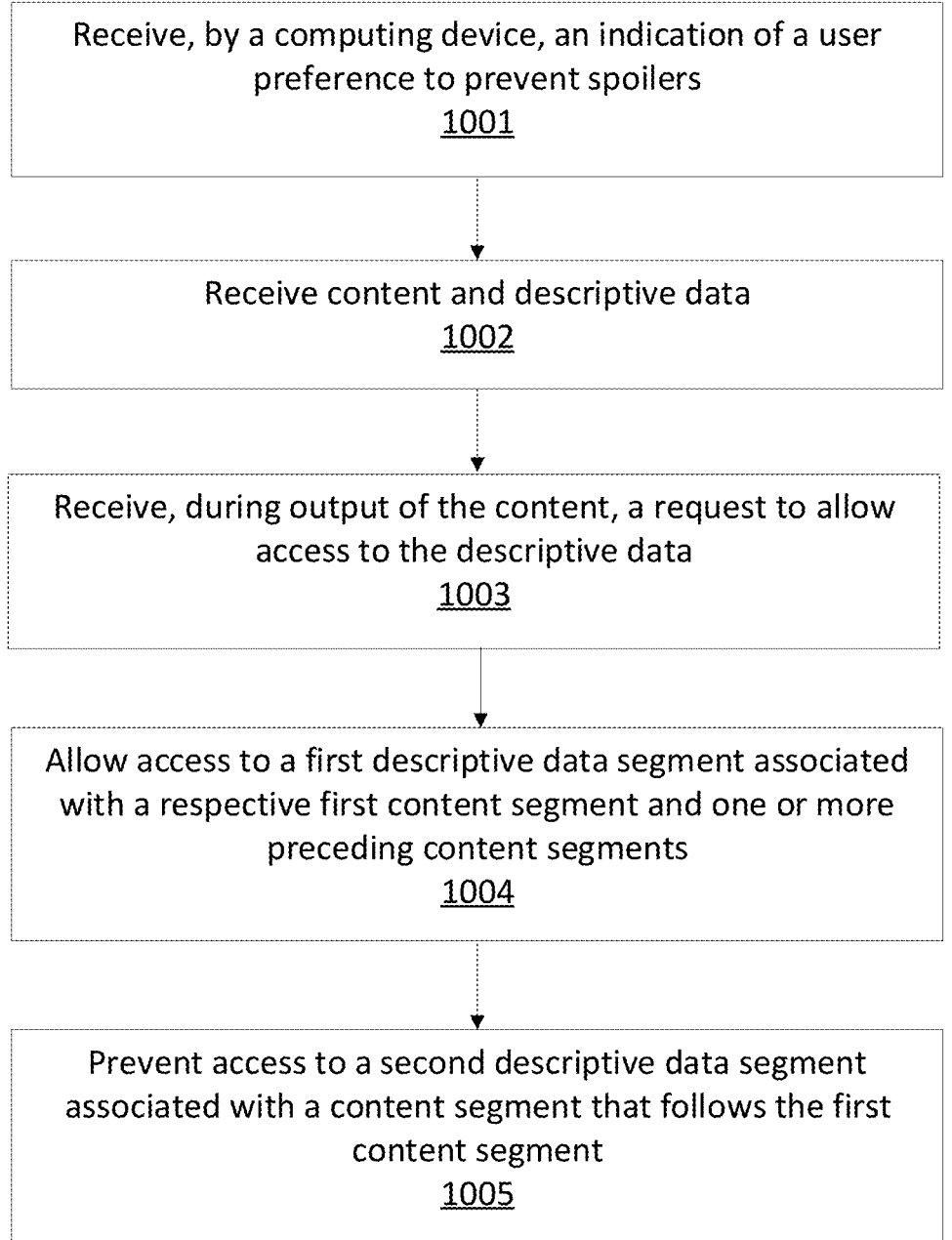

Receive, by a computing device, an indication of a user preference to prevent spoilers
1001

Receive content and descriptive data
1002

Receive, during output of the content, a request to allow access to the descriptive data
1003

Allow access to a first descriptive data segment associated with a respective first content segment and one or more preceding content segments
1004

Prevent access to a second descriptive data segment associated with a content segment that follows the first content segment
1005

FIG. 10

MANAGING CONTENT DATA

BACKGROUND

The significance of descriptive data (e.g., in domain such as movies or content streaming platforms) lies in its ability to structure, classify, and convey content-related information to viewers. This information may encompass basic elements such as movie titles, names of directors, genre classifications, release timelines, and content evaluations, and much more. Managing descriptive data, such as access to descriptive data prior to a desired time, may involve significant challenges including maintaining accuracy and consistency across diverse platforms. These and other shortcomings are identified and addressed in the disclosure.

SUMMARY

The following summary presents a simplified summary of certain features. The summary is not an extensive overview and is not intended to identify key or critical elements.

Systems, apparatuses, and methods are described for managing descriptive data within content. In one aspect, properly managed descriptive data may prevent untimely access to the descriptive data, for example, to prevent spoilers related to content and enhance viewer engagement. The timing and visibility of descriptive data (e.g., character details, plot points, filming locations, etc.) may be dynamically controlled, for example, based on a viewer's progress through the content. This approach may ensure that information about characters, plot developments, and/or other narrative elements may be revealed when contextually appropriate, and not before, therefore preserving the suspense and integrity of the storyline. Additionally, by using descriptive data from content creators and/or third parties, the viewing experience may be further enhanced.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 10 is a flowchart showing an example method for a computing device to manage the sequential output of content and descriptive data according to various aspects of the disclosure.

DETAILED DESCRIPTION

Figure 1:
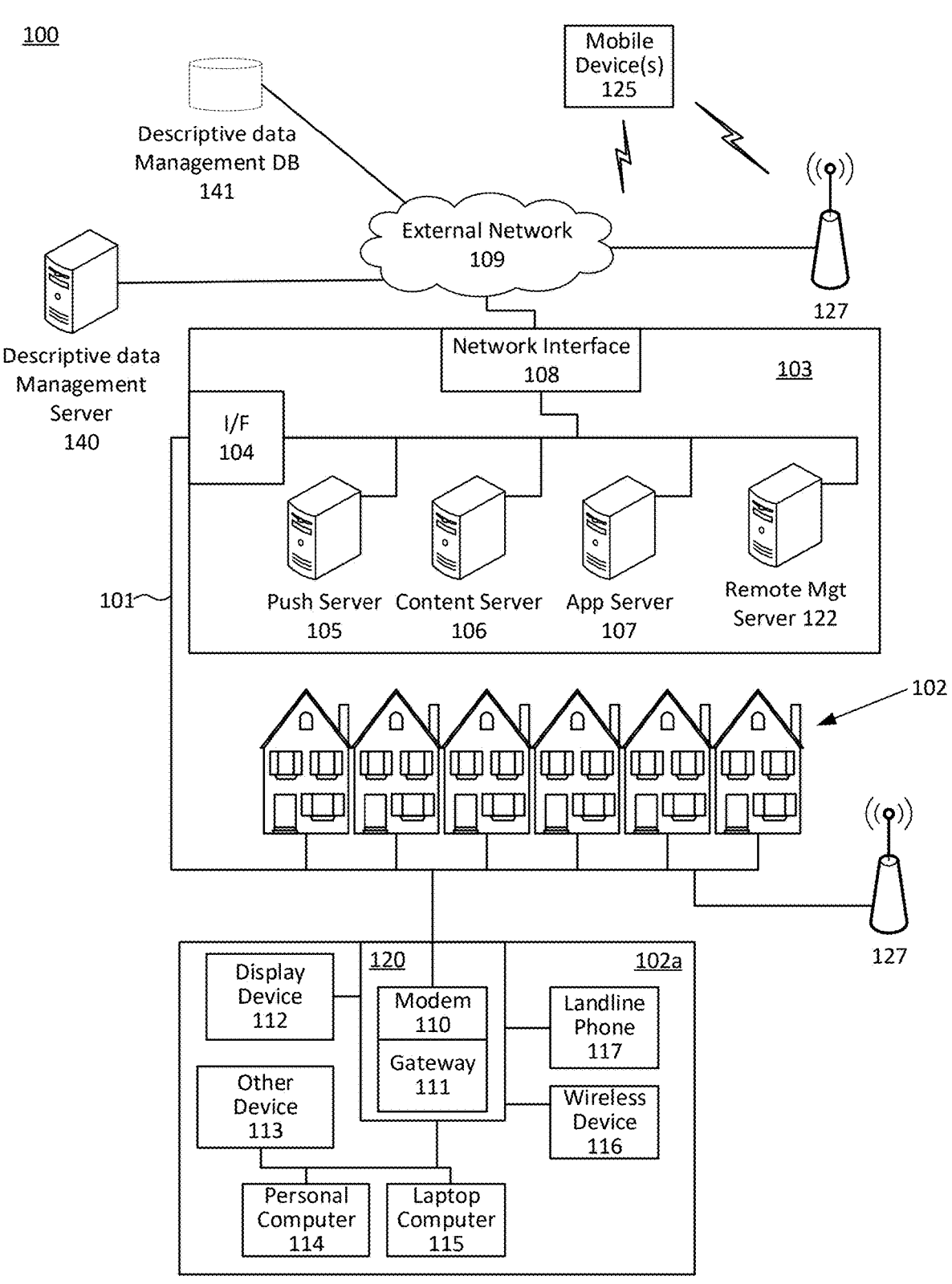
FIG. 1 is a functional block diagram depicting an example communication network according to aspects of the disclosure.

The accompanying drawings, which form a part hereof, show examples of the disclosure. It is to be understood that the examples shown in the drawings and/or discussed herein are non-exclusive and that there are other examples of how the disclosure may be practiced.

FIG. 1 is a functional block diagram depicting an example communication network according to aspects of the disclosure. More specifically, FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the remote management ("Mgt") server 122, additional push, content, and/or application servers, and/or other types of servers. Also or alternatively, one or more servers may be part of the external network 109 and may be configured to communicate (e.g., via the local office 103) with computing devices located in or otherwise associated with one or more premises 102.

For example, a descriptive data management server 140 may communicate with the local office 103 (and/or one or more other local offices), one or more premises 102, one or more access points 127, one or more mobiles devices 125, and/or one or more other computing devices via the external network 109. The descriptive data management server 140 may perform speech recognition processing and/or other operations, as described below. Also or alternatively, the descriptive data management server 140 may be located in the local office 103, in a premises 102, and/or elsewhere in a network. The descriptive data management server 140 may communicate with a descriptive data management database (DB) 141. The descriptive data management database 141 may store libraries and/or other data that may be used in connection with speech recognition processing performed by the descriptive data management server 140. For example, and as described below, separate libraries and/or other data may be maintained for use in performing speech recognition for audio input received from different sources (e.g., from devices associated with different users, premises, accounts, etc.). Although shown as a separate element, the descriptive data management database 141 may be part of the descriptive data management server 140. Also or alternatively, the push server 105, the content server 106, the application server 107, the remote management server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
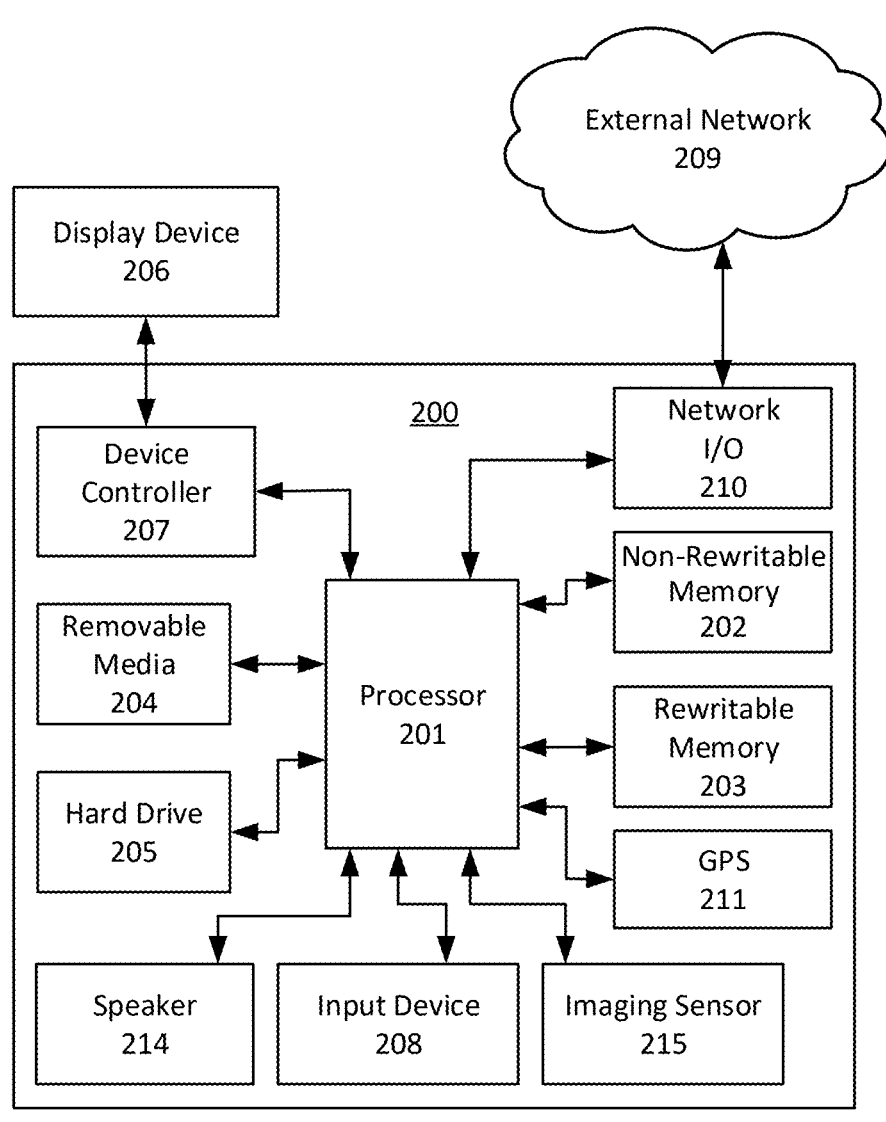
FIG. 2 is a functional block diagram depicting example hardware elements of a computing device according to aspects of the disclosure.

FIG. 2 is a functional block diagram depicting example hardware elements of a computing device according to aspects of the disclosure. More specifically, FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLU-ETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

In content (e.g., movies, television series, streaming platforms, etc.), descriptive data, often referred to as "data about data," may encompass a wide array of information that describes the content. For example, the descriptive data may include the title, director, release date, genre, cast, and/or even more nuanced elements such as themes, plot summaries, critical ratings, etc. This layer of information, embedded within or associated with content, may provide crucial insights into the content's backstory, genre, cast, crew, and production details, among others. For example, by offering context such as the director's intent, historical setting, or thematic explorations, descriptive data may enrich the viewing experience, allowing viewers to connect with the content on a more profound level.

For example, in a movie "Psycho," some descriptive data examples (e.g., title, actors, characters, director, filming locations, background music, plot points, etc.) may enhance a viewer's engagement with the movie. The descriptive data title, "Psycho," may serve as the primary identifier for the movie. The actor descriptive data may feature Anthony Perkins as Norman Bates and Janet Leigh as Marion Crane, whose performances may be central to the movie's tension. The director descriptive data may list Alfred Hitchcock. The filming location descriptive data may provide information that the Bates Motel is filmed on the Universal Studios backlot. Background music descriptive data, Bernard Herrmann's music, particularly during the shower scene, may become a defining sound of horror. Any other descriptive data relating to the movie may provide additional layers of context and insight, enriching the viewer's understanding and appreciation of the film's craftsmanship and thematic depth.

Poorly managed descriptive data in a single movie may significantly detract from the viewer's enjoyment and anticipation. For example, the movie "Psycho" revolves around the complex relationship between Norman Bates and his domineering mother, Norma. The narrative leads the viewer to believe that Norma is committing murders of young women staying at their motel, with Norman cleaning up after her crimes. However, the climax reveals a shocking twist: Norma has been dead for years, and Norman, suffering from dissociative identity disorder, commits the murders under the guise of his mother personality.

Figure 3:
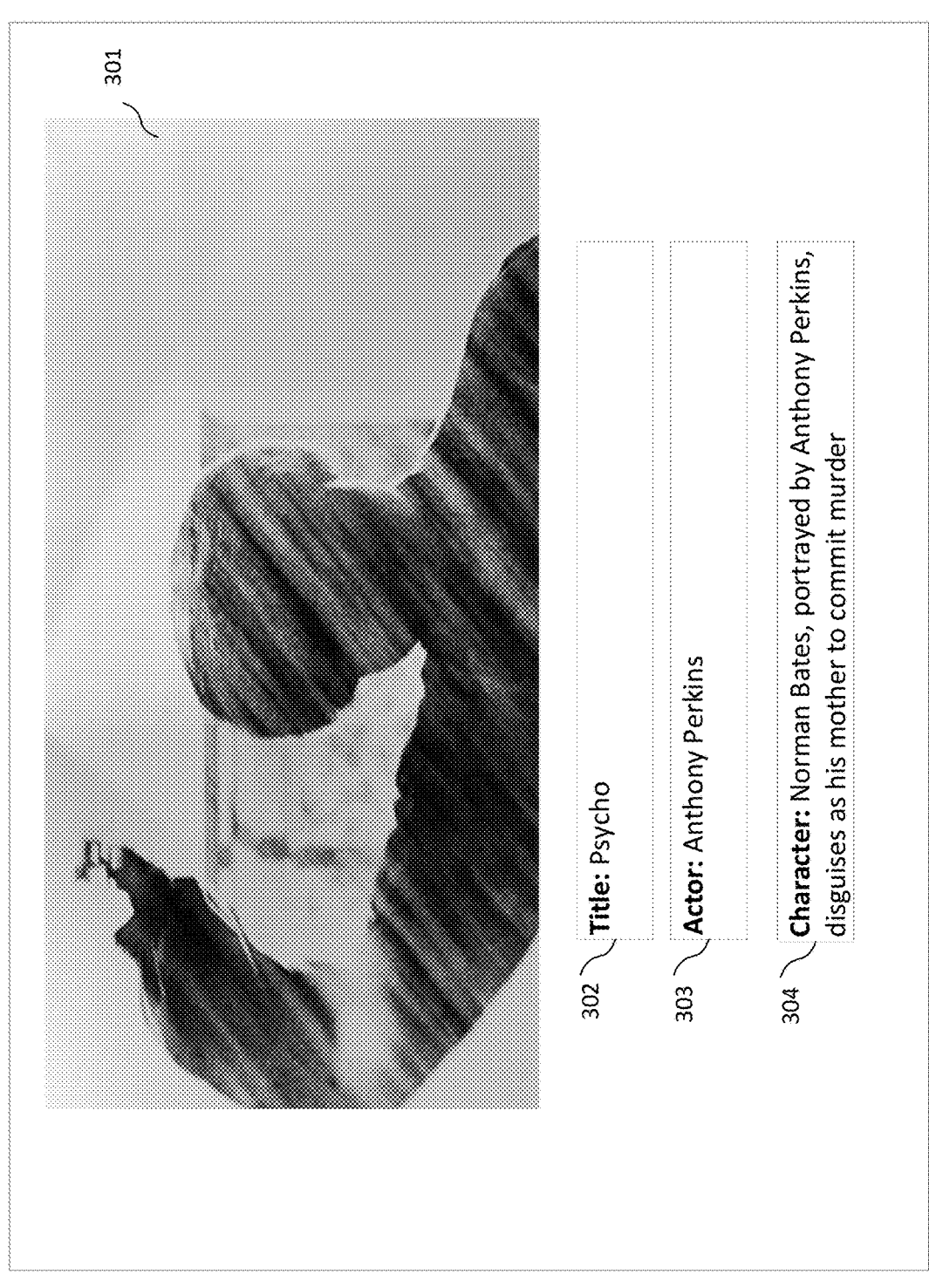
FIG. 3 shows an example of improperly managed descriptive data in a movie.

FIG. 3 shows an example of improperly managed descriptive data in a movie. For example, example 300 shows a plurality of descriptive data examples (e.g., title 302, actor 303, character 304) that may enhance a viewer's engagement with a movie (e.g., screen 301). The screen 301 shows the iconic shower scene from "Psycho," where Marion Crane, played by Janet Leigh, is unexpectedly attacked by a shadowy figure wielding a knife while taking a shower in her room at the Bates Motel. The scene may be intense, marked by chilling music, quick cuts, and the sheer suddenness of the attack, leaving the viewer in shock and horror. The figure's identity is obscured, maintaining the mystery and heightening the suspense of the narrative.

However, improperly managed descriptive data (e.g., actor 303 and/or character 304) for this scene (e.g., screen 301) may be information that may reveal the identity of the attacker (e.g., character 304 revealing the attacker is Norman Bastes) before the movie has presented this detail organically within its storyline. For example, the actor 303 and the character 304 displayed during or immediately after this scene, stating "Actor: Anthony Perkins" and "Character: Norman Bates, portrayed by Anthony Perkins, disguises as his mother to commit murder" may be improper. Improperly managed descriptive data may directly spoil one of the central mysteries of the movie: the true identity of the murderer and the complex psychological background driving Norman's actions.

Such premature revelation may significantly diminish the suspense and shock that may be central to the viewing experience of "Psycho." The effectiveness of the narrative may rely on the gradual unveiling of Norman Bates's dual nature and the discovery of his tragic and horrifying secrets. Proper descriptive data for this scene, before the plot fully unfolds, may focus on aspects such as the groundbreaking cinematography, the background music's contribution to the tension, or the scene's place in film history, without revealing crucial plot details that the viewer is not yet meant to know.

In the context of implementing scene-specific descriptive data within "Psycho," information may need to be carefully curated to maintain the movie's inherent suspense while enhancing the viewer's understanding and engagement. For example, descriptive data such as character details and/or plot points may need to be revealed, only when it becomes contextually appropriate based on the viewer's progress through the content.

As viewers are introduced to Norman Bates, portrayed by Anthony Perkins, the descriptive data may provide basic information that sets the stage without giving away future plot twists. For example, before the climax, viewers may receive descriptive data such as "Character: Norman Bates. A seemingly shy and awkward hotel manager living with his domineering mother, Norma." This descriptive data may establish character context without spoiling the unfolding mystery.

During the infamous shower scene (e.g., screen 301 in FIG. 3), one of the movie's most critical junctures, specific descriptive data that may prematurely reveal the murderer's identity may need to be withheld. The narrative's turning point (e.g., the revelation of Norman's dissociative identity disorder and the true nature of his 'mother') may be a crucial moment that demands careful handling of descriptive data.

Revealing insights (e.g., Norman's psychological condition or the full scope of his actions) may need to be locked behind progress-specific timestamps, wherein each timestamp may indicate a specific point in time within the duration of the content. Only after the viewer reaches the pivotal scenes where these facts are disclosed within the content does the descriptive data update to reflect these major plot twists.

After the narrative unfolds and the central mysteries are resolved, the descriptive data may provide contextual information and/or cinematic history, etc. This method may help keep the viewing experience of "Psycho" free from spoilers, ensuring it remains as suspenseful and engaging as the director Hitchcock intended. By dynamically adjusting descriptive data, for example, based on viewer progress, the integrity of the storyline may be preserved, and the overall viewing experience may be enhanced.

As described herein, storyline spoilers may be prevented. Spoilers, especially in serialized storytelling such as television series or multi-part movies, may significantly detract from the viewer's enjoyment and anticipation. To ensure viewers only see information such as character developments or plot summaries appropriate to their place in the story, descriptive data may be hidden. This approach aims to protect narrative suspense and surprise, which are crucial elements of storytelling, by dynamically adjusting the descriptive data displayed based on the viewer's progression through the content.

Additionally or alternatively, confusion may be eliminated in scenes with timestamp-specific information. Complex narratives or scenes with multiple characters and intertwined plotlines may be challenging to follow. Viewers may struggle to understand the significance of a particular scene or remember the backstory of a character that suddenly reappears after several episodes. By providing timestamp-specific descriptive data, contextual information or reminders may be offered at precise moments. For example, during a crucial but complex plot development, a brief overlay may be provided to explain the significance of the event based on the viewer's current point in the storyline, without revealing future spoilers. By carefully managing scene-specific descriptive data to avoid prematurely revealing crucial plot points or character secrets, viewers may experience the narrative as the director intended, maintaining the story's suspense and surprise to the fullest.

Figure 4:
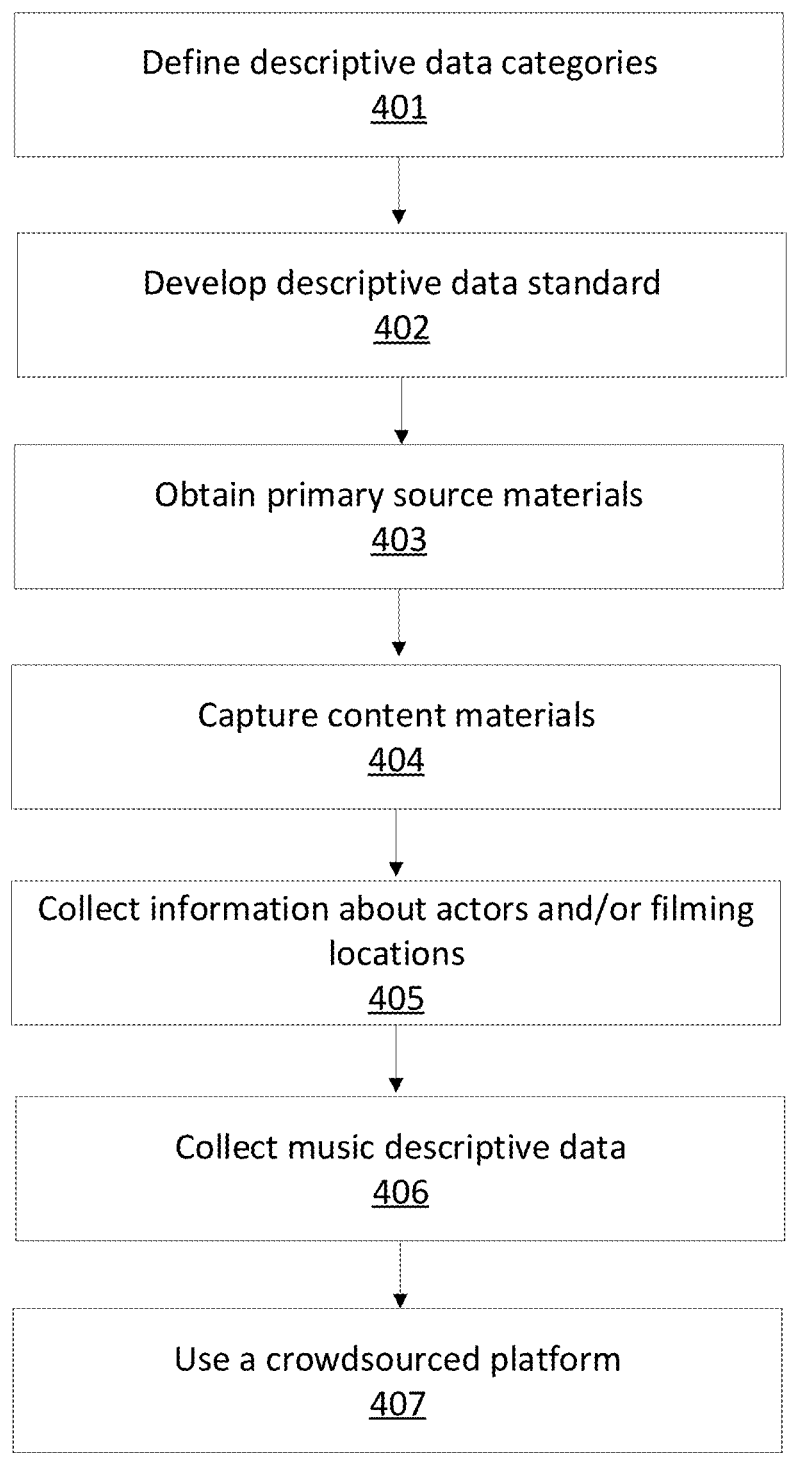
FIG. 4 is a flowchart depicting an example of a descriptive data collection method according to various aspects of the disclosure.

FIG. 4 is a flowchart depicting an example of a descriptive data collection method according to various aspects of the disclosure. More specifically, FIG. 4 shows an example of a comprehensive descriptive data collection method to collect detailed information about content. The detailed information about content may comprise character developments, plot points, actor biographies, filming locations, music, and/or anything relating to the content, for example, to enhance viewer engagement, improve content discovery, and/or provide a more informed viewing experience. One, some, or all steps of the example method of FIG. 4 may be performed by the descriptive data management server 140, and for convenience, FIG. 4 will be described below in connection with the descriptive data management server 140. Also or alternatively, one, some, or all steps of the example method of FIG. 4 may be performed by one or more other computing devices. One or more steps of the example method of FIG. 4, and/or one or more communications described in connection with the method of FIG. 4, may be rearranged (e.g., performed, sent, or received in a different order), omitted, and/or otherwise modified, and/or other steps and/or communications added. A communication described in connection with the example method of FIG. 4 need not be a single message nor contained in a single packet, block, or other transmission unit.

At step 401, a descriptive data management server 140 may define descriptive data categories. For example, key categories of descriptive data to be collected for each piece of content may be identified. The key categories may comprise character developments, plot points, actor biographies, filming locations, music, and/or any other information relating to the content. Step 401 may, for example, comprise receiving user input to select descriptive data categories and/or parsing content item(s), descriptive data corresponding to such content items(s), and/or other materials to determine categories of descriptive data to be collected for each piece of content.

At step 402, the descriptive data management server 140 may develop descriptive data standards. For example, standardized formats and guidelines may be created for how each piece of descriptive data may be documented. For example, the format may be organized in Extensible Markup Language (XML). The XML format may include time-dependent action information. The XML format may be used to synchronize descriptive data with the content's timeline and/or help users receive relevant information as they watch. This may ensure consistency across all content and facilitate easier integration and retrieval. Step 402 may, for example, comprise receiving user input to specify formatting, applying one or more templates (e.g., to categories determined in step 401), etc.

At step 403, the descriptive data management server 140 may obtain primary source materials (e.g., scripts, production notes, and/or creator insights, etc.). Obtaining primary source materials such as scripts, production notes, and/or creator insights may be essential for a deeper understanding of the filmmaking process. Scripts may offer a glimpse into the original narrative vision, highlighting the story's structure and/or any adaptations from script to screen. Production notes may provide a detailed account of the daily operations, including logistical and artistic decisions, which may illuminate the complexities of film production. Insights from creators, including directors and writers, may offer valuable perspectives on the creative vision, thematic choices, challenges faced, etc. Step 403 may, for example, comprise receiving data files for scripts, production notes, creator insights, and/or other types of source materials.

At step 404, the descriptive data management server 140 may capture the thoughts and/or intentions of content creators behind character arcs, story descriptions, and other creative aspects of the content. Capturing the thoughts and/or intentions of content creators behind character arcs, story descriptions, and other creative aspects of the content may offer a unique window into the artistic process, enhancing the viewer's understanding and connection to the content. By delving into the minds of the creators, the nuances of character development may be uncovered. Step 404 may, for example, comprise parsing the source material(s) for key words; correlating portions of the source material(s) to different portions of corresponding content items, etc.

At step 405, the descriptive data management server 140 may collect information about actors and/or filming locations. For example, comprehensive biographies, interviews about their roles and/or experience on set, etc. may be collected. Additionally, location information (e.g., location scouting reports and/or production diaries, etc.) may further be collected, for example, to document where scenes were filmed, providing viewers with real-world connections to the content. Step 405 may, for example, comprise receiving data related to the collected information, searching databases, for example, based on actor names, content titles, and/or other relevant keywords, and/or retrieving relevant information from the databases.

At step 406, the descriptive data management server 140 may collect music descriptive data. For example, at least some music that may be used in the content, including context for each piece's inclusion, may be collected. Additionally, at least some music descriptive data may include appropriate rights information, which may help in sharing or linking to official soundtracks. Step 406 may, for example, comprise receiving user input to select music, receiving data related to the music used in the content, searching music databases, for example, based on song titles, composer names, and/or other relevant keywords, and/or retrieving relevant information.

Figure 5:
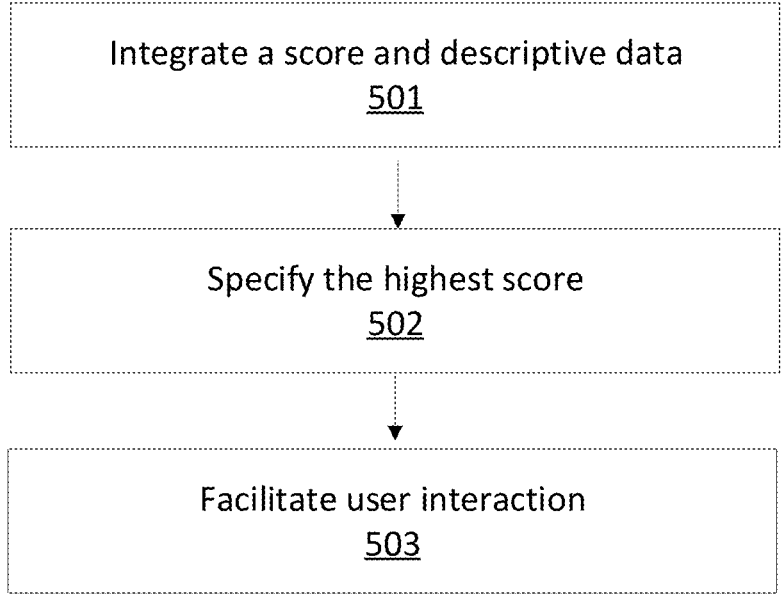
FIG. 5 is a flowchart depicting an example of a method for dynamically adjusting content ratings according to various aspects of the disclosure.

At step 407, the descriptive data management server 140 may use a crowdsourced platform feature, for example, to allow viewers to send additional descriptive data, insights, corrections, and/or any other relevant information. The crowdsourced platform feature may a component within a digital platform that may leverage the collective input, data, or content contributed by its users. The crowdsourced platform feature may be designed to collect and/or utilize information and/or content that may be generated by a large number of people, for example, to improve the platform's accuracy and/or user experience, etc. Additionally, the crowdsourced descriptive data may be reviewed and validated to ensure its reliability. Step 407 may, for example, comprise receiving user input to send insights, corrections, reviews, validations, and/or any other relevant information FIG. 5 is a flowchart depicting an example of a method for dynamically adjusting content ratings according to various aspects of the disclosure. One, some, or all steps of the example method of FIG. 5 may be performed by the descriptive data management server 140, and for convenience, FIG. 5 will be described below in connection with the descriptive data management server 140. Also or alternatively, one, some, or all steps of the example method of FIG. 5 may be performed by one or more other computing devices. One or more steps of the example method of FIG. 5, and/or one or more communications described in connection with the method of FIG. 5, may be rearranged (e.g., performed, sent, or received in a different order), omitted, and/or otherwise modified, and/or other steps and/or communications added. A communication described in connection with the example method of FIG. 5 need not be a single message nor contained in a single packet, block, or other transmission unit.

At step 501, a descriptive data management server 140 may integrate a score (e.g., Common Sense Media score) and descriptive data for each segment of content. For example, the score, such as Common Sense Media score, may be a numerical or categorical rating that may be assigned to content (e.g., movies, TV shows, or games, etc.) to evaluate its appropriateness for different user groups based on various factors. Common Sense Media, for example, may provide detailed ratings that may consider elements such as violence, language, drug use, thematic elements, etc. The score may help ensure content consumption may respect viewer sensitivity and/or preferences. The score, along with associated descriptive data, may be linked to precise timestamps within the content's timeline, indicating the start and end of each evaluated content segment. Step 501 may, for example, comprise receiving user input, evaluating (e.g., using one or more machine-learned algorithms) each segment of the content, for elements (e.g., violence, language, etc.), assigning a score to quantify its sensitivity level to each segment of content, and/or dynamically adjusting the content's scores (e.g., rating) (e.g., changing a PG-13 movie into PG or an R-rated movie into PG-13).

At step 502, the descriptive data management server 140 may specify the highest score to accept, reflecting sensitivity threshold. The descriptive data management server 140 store and/or retrieve the descriptive data, comprising scores and/ or timestamps for each content segment, in real-time as the content may play. Step 502 may, for example, comprise receiving user input, maintaining the user's preferences to apply them consistently across different viewing sessions, specifying a user-defined sensitivity threshold (e.g., the highest score), and/or using the user-defined sensitivity threshold (e.g., the highest score) to flag content segment to be skipped.

At step 503, the descriptive data management server 140 may facilitate user interaction. For example, users may interact with content in real-time, adjusting their highest score threshold and/or selecting to view or skip flagged scenes. They may also provide feedback, which may be crowdsourced to gather a wide range of viewer insights. This feedback, combined with descriptive data, may help train one or more machine-learned algorithms, contributing to the ongoing refinement and/or accuracy of content segment scores. Step 503 may, for example, comprise receiving user input, selecting the highest score threshold (e.g., from step 502) by processing (e.g., using one or more machine-trained algorithms) content and/or data relating to content (e.g., data collected in one or more steps of the method of FIG. 4) and/or linking content segments, based on timestamps, to determine whether to skip the content segments.

Figure 6:
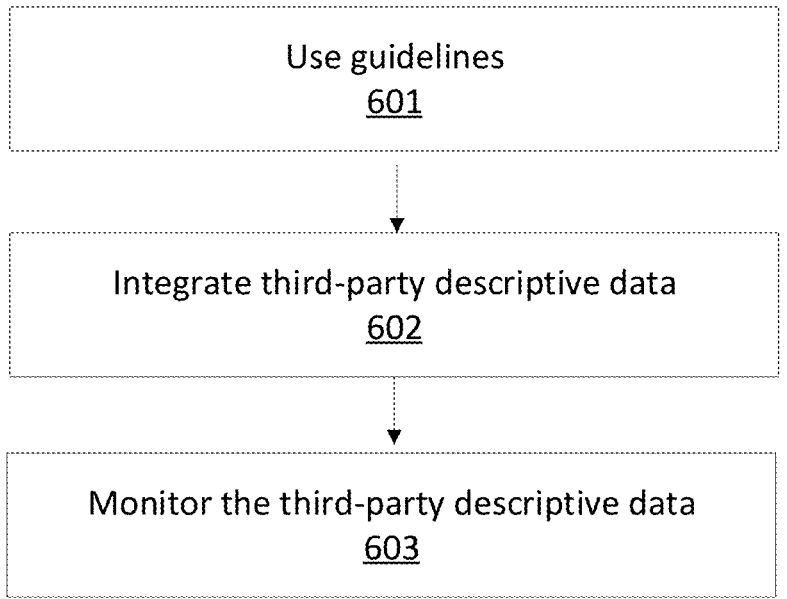
FIG. 6 is a flowchart depicting an example of a method for managing a third-party descriptive data according to various aspects of the disclosure.

FIG. 6 is a flowchart depicting an example of a method for managing third-party descriptive data according to various aspects of the disclosure. More specifically, FIG. 6 shows an example of managing a third-party descriptive data for ensuring accuracy and preventing spoilers. For example, a structure may be used for accepting, verifying, and/or integrating descriptive data contributions from external sources. This may ensure that the additional descriptive data enhances the user's experience without spoiling key plot points or character developments. One, some, or all steps of the example method of FIG. 6 may be performed by the descriptive data management server 140, and for convenience, FIG. 6 will be described below in connection with the descriptive data management server 140. Also or alternatively, one, some, or all steps of the example method of FIG. 6 may be performed by one or more other computing devices. One or more steps of the example method of FIG. 6, and/or one or more communications described in connection with the method of FIG. 6, may be rearranged (e.g., performed, sent, or received in a different order), omitted, and/or otherwise modified, and/or other steps and/or communications added. A communication described in connection with the example method of FIG. 6 need not be a single message nor contained in a single packet, block, or other transmission unit.

At step 601, a descriptive data management server 140 may publish, implement, and/or otherwise use guidelines, for example, for third-party descriptive data submissions. For example, the guidelines may comprise types of descriptive data accepted, formats in which it should be submitted, standards for accuracy and/or relevance, and/or any other requirements to ensure the quality and/or consistency of the descriptive data. Furthermore, the guidelines may comprise specific instructions on avoiding spoilers in submissions. By using the guidelines, the descriptive data management server 140 may efficiently manage and/or curate the submitted descriptive data from at least one third-party, to ensure that all information may be accurate and/or relevant. Step 601 may, for example, comprise receiving guidelines to manage and/or output, based on the guidelines, the descriptive data received from at least one third party.

At step 602, the descriptive data management server 140 may integrate third-party descriptive data into content creator descriptive data with conditional visibility triggers. For example, conditional visibility triggers may comprise rules and/or conditions that may determine when certain descriptive data should be output to a user. For example, a conditional visibility trigger may be set to show, for example, a character's background information only after the character has been introduced in content. The conditional visibility triggers may ensure that specific descriptive data information may be shown at appropriate times. This step may ensure that third-party descriptive data may be only displayed to users at the appropriate points. Step 602 may, for example, comprise receiving user input whether to select third-party descriptive data, receiving third-party descriptive data, applying one or more flags to portions of the third party descriptive data so that the third party descriptive data portions conform to the guidelines of step 601, etc. Step 602 may, for example, comprise processing (e.g., using one or more machine-learned algorithms) the third-party descriptive data using steps similar to steps 501 and 503 of the method of FIG. 5 and/or combining the third-party descriptive data with other descriptive data (e.g., descriptive data generated by a content creator or other source) based, for example, on timestamps associated with the third-party descriptive data and timestamps associated with the other descriptive data.

At step 603, the descriptive data management server 140 may monitor the third-party descriptive data alongside first-party (and/or other) descriptive data for accuracy and/or relevance. As the content may evolve and/or new insights may emerge, the descriptive data management server 140 may update and/or refine the third-party descriptive data as needed. Step 603 may, for example, comprise receiving the updated third-party descriptive data, and/or re-performing step 602 (e.g., based on updates to guidelines of step 601) on third-party descriptive data.

Figure 7:
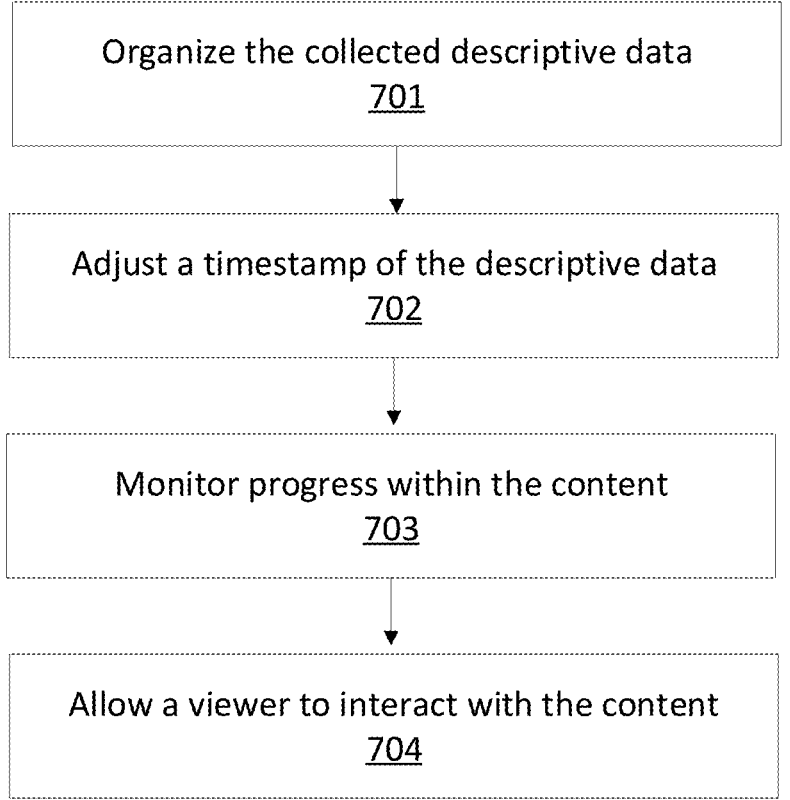
FIG. 7 is a flowchart depicting an example method for a viewer to receive an enhanced experience in content with descriptive data according to various aspects of the disclosure.

FIG. 7 is a flowchart depicting an example method for a user to receive an enhanced experience in content with descriptive data according to various aspects of the disclosure. One, some, or all steps of the example method of FIG. 7 may be performed by the descriptive data management server 140, and for convenience, FIG. 7 will be described below in connection with the descriptive data management server 140. Also or alternatively, one, some, or all steps of the example method of FIG. 7 may be performed by one or more other computing devices. One or more steps of the example method of FIG. 7, and/or one or more communications described in connection with the method of FIG. 7, may be rearranged (e.g., performed, sent, or received in a different order), omitted, and/or otherwise modified, and/or other steps and/or communications added. A communication described in connection with the example method of FIG. 7 need not be a single message nor contained in a single packet, block, or other transmission unit.

At step 701, a descriptive data management server 140 may collect descriptive data and organize (e.g., rank) the collected descriptive data, for example, by its level of importance relating to content. This organizing (e.g., ranking) may prioritize descriptive data, for example, based on its relevance to the storyline, character development, user interest, and/or any other information relating to the content. For example, details important to understanding the plot's progression may be ranked higher than, for example, interesting but non-essential trivia. The importance of descriptive data may be organized (e.g., ranked) into, for example, three distinct narrative stages: introductory, developmental, and climatic. Introductory descriptive data may provide essential background information that may set up the story and characters. Developmental descriptive data may cover the progression and evolution of the plot and character arcs, enriching the user's understanding as the story unfolds. Climatic descriptive data may be reserved for key moments that may culminate the narrative tension and resolution, ensuring that critical revelations and plot twists may be appropriately timed to maximize impact and maintain suspense.

Step 701 may, for example, comprise evaluating (e.g., using one or more machine-learned algorithms) descriptive data by its level of importance relating to content, extracting (e.g., using Natural Language Processing (NLP) techniques) descriptive data from various sources (e.g., scripts, subtitles, etc.), analyzing the descriptive data to assess its relevance to content (e.g., storyline, character development, user interest, and/or other important content factors), determining the rank of the descriptive data based on predefined rules and/or crowdsourced information (e.g., similar to step 503 in FIG.

5), categorizing the descriptive data into predefined stages such as introductory, developmental, and climatic, and/or dynamically adjusting the ranking based on real-time data and/or occasional user feedback.

At step 702, the descriptive data management server 140 may adjust timestamps associated with high-importance descriptive data. Each timestamp may signify a specific moment within the content's timeline, ensuring that important information may be revealed at the right time. For example, this adjustment may be based on narrative pacing and/or align with user expectations, enhancing the storytelling experience without revealing spoilers prematurely. Each timestamp may be specifically tied to one or more events within the content. These events may range from key plot points, character introductions, climactic scenes, to any significant moments that may be associated with the narrative progression. By associating timestamps with these events, the descriptive data may be more integrated into the storytelling process, enabling users to access relevant information more precisely when it may matter most.

Step 702 may, for example, comprise identifying (e.g., using one or more machine-learned algorithms and/or predefined criteria) high-importance descriptive data to recognize key elements (e.g., plot points, plot twists, etc.), assigning initial timestamps to high-importance descriptive data based on its association with content segment, comparing high-importance descriptive data to other descriptive data to ensure the timestamps are correctly sequenced, checking that high-importance descriptive data does not precede other important information that must be understood first, and/or dynamically adjusting the timestamps to align with the narrative pacing.

At step 703, the descriptive data management server 140 may monitor a user's progress through the content to present descriptive data at appropriate times. This may involve tracking how the user interacts with the content, including pausing, skipping, and/or replaying segments, etc. to ensure that descriptive data delivery may be synchronized with the user's actual experience of the content (e.g., so that descriptive data is not output prematurely).

At step 704, the descriptive data management server 140 may allow a user to interact with the content. This method may facilitate user interaction with the content, such as selecting different paths in an interactive story or choosing to explore additional information about a scene. User interactions may influence how and when different pieces of descriptive data may be displayed, tailoring the experience to individual preferences and engagement levels.

For example, recognizing the diverse preferences of users regarding spoilers, users may be allowed to customize their spoiler protection level. This method may enable users to decide how much of the future plot details they wish to be revealed through descriptive data. Some users may prefer complete protection to experience the narrative with full surprise, while other users may wish for more informational depth, even at the risk of encountering spoilers. This customization may empower users to tailor their content experience based on their personal preferences.

The method may further distinguish between different modes of user engagement with the content: active viewing, background playback, and/or re-watching. Active viewing may imply the user's full attention to the content, background playback may suggest the content is playing without the user's full attention, and/or re-watching may indicate the user has previously seen the content. This distinction may enable tailoring the display of descriptive data and interactions to match the user's engagement level, enhancing relevance and preventing unnecessary repetitions or spoilers.

User interaction-based recommendation may be incorporated. Recommendations for the user may be generated based on their interactions with the content. These recommendations may include related content, deeper dives into topics of interest revealed through user interaction, or suggestions for scenes and/or information the user may have missed or shown interest in. This personalized approach may ensure that recommendations are meaningful.

Descriptive data may be prioritized, and content may be recommended, for example, based on the user's interests and past viewing history. By analyzing previous interactions and/or engagements, patterns and/or preferences may be identified, allowing for the display of descriptive data and content that may closely align with the user's preferences. The collected descriptive data may be sent to be displayed in a format and timing conditioned by the previous steps. This means the descriptive data may be dynamically tailored and delivered, for example, based on the importance ranking, user's progress, and interaction with the content. The goal is to ensure that the information enhances the content without disrupting the narrative flow, providing a seamless and enhanced viewing experience.

Figure 8:
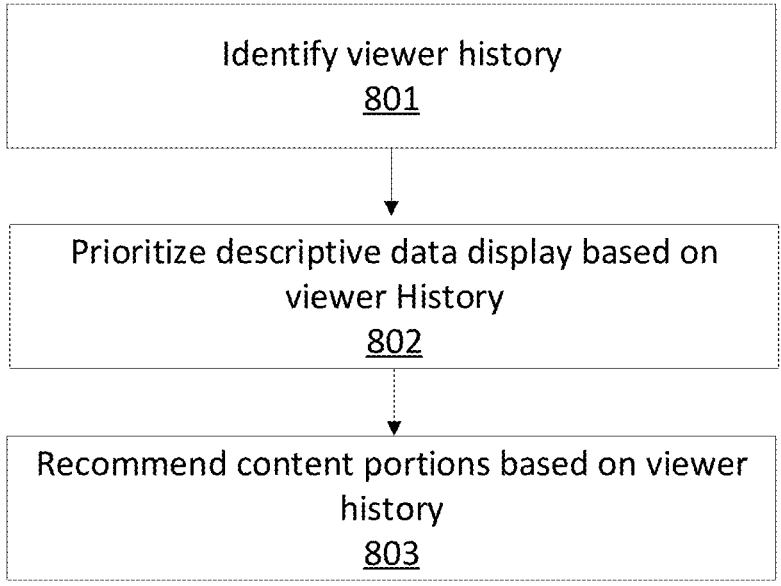
FIG. 8 is a flowchart depicting an example method for a viewer to receive an enhanced experience in content with descriptive data according to various aspects of the disclosure.

FIG. 8 is a flowchart depicting an example method for a user to receive an enhanced experience in content with descriptive data according to various aspects of the disclosure. One, some, or all steps of the example method of FIG. 8 may be performed by the descriptive data management server 140, and for convenience, FIG. 8 will be described below in connection with the descriptive data management server 140. Also or alternatively, one, some, or all steps of the example method of FIG. 8 may be performed by one or more other computing devices. One or more steps of the example method of FIG. 8, and/or one or more communications described in connection with the method of FIG. 8, may be rearranged (e.g., performed, sent, or received in a different order), omitted, and/or otherwise modified, and/or other steps and/or communications added. A communication described in connection with the example method of FIG. 8 need not be a single message nor contained in a single packet, block, or other transmission unit.

At step 801, a descriptive data management server 140 may identify a viewing history associated with a user. For example, a comprehensive profile of a user's viewing history with the content may be created. The viewing history may comprise the genres users have shown interest in, actors they prefer, and/or other viewing preferences evident from their previously viewed content. This data collection may show the viewer's preferences, and/or viewing habits. For example, if a user consistently watches horror films directed by a particular director or featuring a certain actor, this information may be cataloged as part of the user's viewing history.

Step 801 may, for example, comprise receiving user input, searching, based on one or more user identifiers (e.g., media access control (MAC) addresses) of user devices associated with a user, for example, logs, records, and/or other data for content that may have been accessed by that user, analyzing (e.g., using one or more machine-learned algorithms) the searched data to identify patterns and/or preferences, and/or updating the viewing history with user input.

At step 802, the descriptive data management server 140 may prioritize descriptive data display, for example, based on the viewing history. For example, based on the viewing history identified, the descriptive data may be prioritized such that it is most relevant to the viewer's known preferences and/or viewing habits. For example, if a user may have a history of watching action movies with certain actors, the descriptive data related to those actors and/or similar genres may be prioritized and displayed while they may be watching a new content. This prioritization may ensure that the descriptive data displayed may enrich the user's experience, for example, by being directly relevant to their interests and/or previous content interactions, making the content more engaging and personalized.

At step 803, the descriptive data management server 140 may recommend content portions, for example, based on the viewing history. Leveraging the comprehensive viewing history, new content that may align with the viewer's preferences may be recommended. This recommendation may comprise genres, directors, actors, and/or specific content attributes that the user may have shown a preference for in the past. By analyzing this historical data, new movies, TV shows, documentaries, and/or any contents that may have a high likelihood of appealing to the user may be recommend. For example, if the user may have a history of viewing science fiction films directed by certain filmmakers, other films in the same genre and/or by the same director may be recommended. Recommendations may be tailored to the viewer's unique history. The descriptive data management server 140 may recognize (e.g., using one or more machine-learned algorithms) patterns in user's viewing history. The identified patterns may be matched with available content in a descriptive data management database (DB) 141. Personalized recommendations may be generated, for example, by selecting content that may meet the matching criteria. The recommendations may be integrated into the descriptive data associated with the user. For example, recommendations may be added as links to or identifiers of recommended content portions. The recommendations may be updated based on the user's latest viewing history.

At least one machine learning algorithm may be used, for example, to dynamically update recommendations in real-time. This process may begin by collecting and analyzing large datasets that may include user preferences, viewing habits, interaction history, and/or any other information. The machine learning algorithm may learn from the datasets, for example, to identify patterns and/or preferences specific to individual users. As users may interact with content, new data may continuously be fed back into the machine learning algorithm, allowing it to refine and/or adjust the recommendations it may make. As a viewer's preferences may evolve or as they may explore different types of content, the recommendations presented to them may be instantly updated to reflect any changes. The recommendation may be personalized to each viewer's preferences, making finding content easier.

The content recommendations may be dynamically updated based on the viewer's interactions with both the content and the descriptive data. For example, every action taken by the user (e.g., pausing a video, skipping scenes, interacting with descriptive data pop-ups, or expressing preferences, etc.) may be used as input data for a recommendation algorithm. This adaptive approach may ensure that the recommendations evolve with the viewer's changing preferences and behaviors.

Crowdsourced information may be used to enhance the recommendation. This approach may aggregate data and/or comments from a plurality of users, incorporating their collective preferences, ratings, and/or feedback into the recommendation. By utilizing crowdsourced information, for example, suggestions that may have been validated by a plurality of users may be provided. This crowdsourced community-driven approach may validate the recommendations, making them reflective of the collective viewing experience.

Users may be allowed to adjust the recommendations they receive. Users may tweak the recommendations, for example, based on their current mood, preferences, and/or specific content they may want to watch. Recommendations may be filtered by genre, director, actor, and/or any other elements, giving users control the recommendation. By enabling users to tailor the recommendations, more personalized and satisfying content may be provided.

Figure 9:
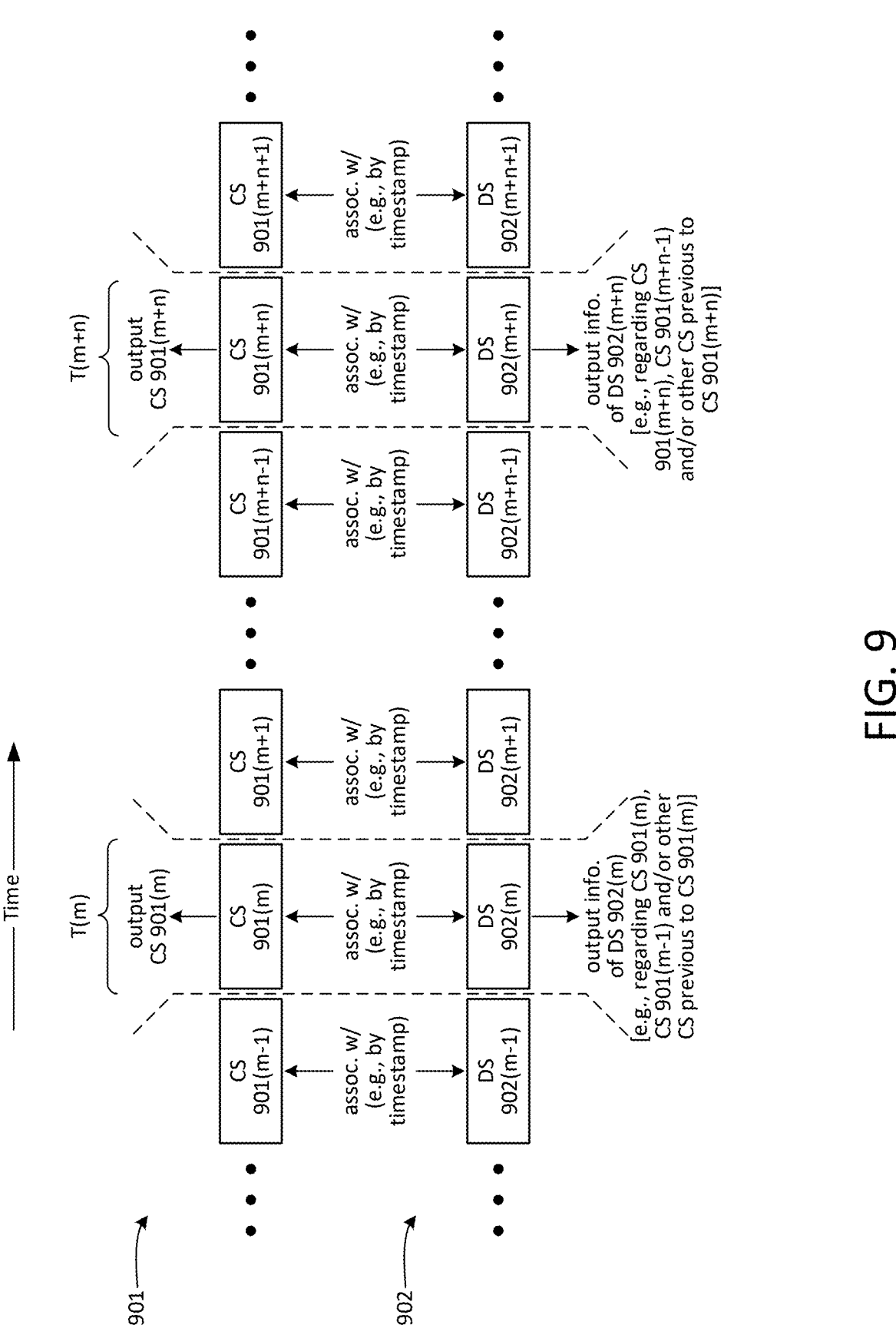
FIG. 9 is a block diagram showing an example for managing output of content and descriptive data.

FIG. 9 is a block diagram showing an example for managing output of content and descriptive data. In the example of FIG. 9, a content item 901 (e.g., a movie) comprises a plurality of sequential content segments (CS) that each corresponds to a portion (e.g., audio and/or video) of the content item 901. Although shown as equally-sized blocks in the example of FIG. 9, the content segments may be of different durations, and/or one or more of the content segments may be of a same duration. Although only a portion of the content segments of the content item 901 are shown in FIG. 9, the content item 901 may comprise content segments 901(1), 901(2), . . . 901($m$−1), 901($m$), 901($m$+1), . . . 901($m$+n−1), 901($m$+n), 901($m$+n+1), . . . , with m and n being arbitrary positive integers and m<n. The content segments may, but need not be, separate files or other data units. For example, multiple (or all) content segments may be part of a single file or other data unit, with each of the multiple (or all) content segments being a different portion of that single file or other data unit.

The content item 901 may be associated with descriptive data 902. The descriptive data 902 may comprise a plurality of descriptive data segments (DS). Although only descriptive data segments 902($m$−1), 902($m$), 902($m$+1), 902($m$+n−1), 902($m$+n), and 902($m$+n+1) are shown, the example of FIG. 9 assumes that there is a single descriptive data segment associated with each content segment. This need not be the case, however. For example, there may be one or more content segments for which there are no associated descriptive data segments, and/or there may be one or more content segments for which there are multiple associated descriptive data segments. Each of the descriptive data segments need not be the same size. The descriptive data segments may, but need not be, separate files or other data units. For example, multiple (or all) descriptive data segments may be part of a single file or other data unit, with each of the multiple (or all) descriptive data segments being a different portion of that single file or other data unit.

A descriptive data segment may comprise a timestamp of its associated content segment. A descriptive data segment may also comprise information regarding its associated content segment and/or information regarding content segments that precede its associated content segments. That information may comprise, for example, narrative information, plot information, character information, information about actors or other persons depicted in the content item, comments from previous viewers of the content, production details, trivia, information regarding music in content audio, user-generated content such as reviews, ratings, and/or discussions from various online forums and/or social media platforms, scholarly articles and/or critical essays about the content, thematic explorations, symbolic interpretations, information about franchise connections, such as spin-offs, prequels, and sequels, interviews with writers, producers, and/or other behind-the-scenes personnel, links to related merchandise, details about content updates such as rereleases and/or remastered editions, legal information about copyright and/or licensing, educational content such as learning guides, lesson plans, and/or interactive maps of fictional worlds, detailed character relationship charts, translations, dialect explanations, descriptions of available accessibility features, health and safety warnings about flashing lights or intense scenes, discussions on the social and cultural impact of the content, prominent quotes, audience demographics, data on content length, details about past and present marketing campaigns, trailers, promotional events, user interaction data such as most-watched scenes or most-commented sections, content ratings by different demographic groups, notable fan theories, links to charitable causes associated with the content, environmental impact statements for productions, acknowledgments of any historical or real-world events depicted in the content, director's notes, filming locations, language or subtitle options, scene settings, character backgrounds, related content recommendations, continuity information, visual effects details, costume and prop details, critical reviews, awards and nominations, audience ratings, release dates, historical context, cultural references, Easter eggs, behind-the-scenes footage, promotional materials, advertisements, interactive features, script excerpts, technical specifications, fan theories, and/or other type(s) of information. This comprehensive information aims to enhance the viewer's experience by providing a deeper understanding and appreciation of the content.

The content item 901 and/or descriptive data 902 may be used for and/or based on one or more methods (e.g., step 401, step 402, step 403, step 404, step 405, step 406, and/or step 407) as described with respect to FIG. 4. For example, the categories of each segment of the descriptive data 902 may be defined and/or used for each segment of the content item 901. The standard of the descriptive data 902 may be developed. For example, standardized formats and guidelines for the descriptive data 902 may be created. The descriptive data 902 may comprise music descriptive data. The thoughts and/or intentions of a content creator (e.g., a creator of content item 901) may be used. Furthermore, the descriptive data 902 comprise descriptive data from a crowdsourced platform. The content item 901 and/or descriptive data 902 may be used for and/or based on one or more methods (e.g., step 501, step 502, and/or step 503) as described with respect to FIG. 5. Timestamps added according to one or more of those methods (or other methods) may be used to associate each segment of the content item 901 with each segment of the descriptive data 902. The content item 901 and/or descriptive data 902 may be used for and/or based on one or more methods (e.g., step 601, step 602, and/or step 603) as described with respect to FIG. 6. For example, at least a portion of the descriptive data 902 of the content item 901 may be collected from at least one third-party. The descriptive data 902 may be monitored alongside first-party descriptive data for accuracy and/or relevance. The content item 901 and/or descriptive data 902 may be used for and/or based on one or more methods (e.g., step 701, step 702, step 703, and/or step 704) as described with respect to FIG. 7. For example, the timestamps added according to one or more of those methods may be used to associate each segment of the content item 901 with each segment of the descriptive data 902. Segments of the descriptive data 902 may be organized (e.g., ranked) by its level of importance relating to the content item 901. Furthermore, a user may interact with the content item 901. The content item 901 and/or descriptive data 902 may be used for and/or based on one or more methods (e.g., step 801, step

802, and/or step 803) as described with respect to FIG. 8. For example, segments of the descriptive data 902 of the content item 901 may be prioritized and/or recommended, for example, based on the viewing history of a user.

The descriptive data 902 may be obtained according to one or more of the methods described in FIGS. 4-8. For example, the descriptive data management server 140 may collect and integrate third-party descriptive data as described in FIG. 7, and then use guidelines from FIG. 6 to ensure accuracy and relevance. Additionally, the timestamps associated with the descriptive data 902 may be added based on the methods outlined in FIG. 5, which involve tagging specific content segments.

FIG. 9 further shows how output of information from descriptive data 902 may be controlled based on a user's progress through the content 901. As a content segment is output, output of information from a descriptive data segment associated with that content segment may be allowed. For example, a media player application may allow a user to toggle on (or off) a display (e.g., in one or more separate windows, as a subtitle track, etc.) of information from descriptive data in conjunction with display of video for a content. Also or alternatively, a user may be permitted to view (e.g., cause output of) information from descriptive data segments associated with previously-output content segments. For example, a media player may allow a user to scroll (e.g., in a separate window via which descriptive data information is output) to information from descriptive data segments associated with previously-output content segments. However, output of information from descriptive data segments associated with not-yet-outputted content segments may be prevented. For example, the media player or other application outputting the content 901 may prevent output of information from descriptive data segments associated with not-yet-outputted content segments.

In the example of FIG. 9, at time T(m), a content segment 901(*m*) may be output (e.g., audio and/or video of the content segment 901(*m*) may be output). Based on the output of the content segment 901(*m*), information from the descriptive data segment 902(*m*) may be output. That information may, for example, comprise information regarding the content segment 901(*m*), regarding the content segment 901(*m*−1), and/or regarding other content segments previous to the content segment 901(*m*). However, information from descriptive data segments associated with content segments that have not yet been output (e.g., the content segment 901(*m*+1) and subsequent content segments) is prevented from being output.

Output of information from other descriptive data segments may be similarly managed. For example, at time T(m+n), a content segment 901(*m*+n) may be output (e.g., audio and/or video of the content segment 901(*m*+n) may be output). Based on the output of the content segment 901(*m*+ n), information from the descriptive data segment 902(*m*+n) may be output. That information may, for example, comprise information regarding the content segment 901(*m*+n), regarding the content segment 901(*m*+n−1), and/or regarding other content segments previous to the content segment 901(*m*+n). However, information from descriptive data segments associated with content segments that have not yet been output (e.g., the content segment 901(*m*+n+1) and subsequent content segments) is prevented from being output.

FIG. 10 is a flowchart showing an example method for a computing device to manage the sequential output of content and descriptive data according to various aspects of the disclosure. The method of FIG. 10 may, for example, be performed in connection with the example content item 901 and descriptive data 902 of FIG. 9. One, some, or all of the steps of the method of FIG. 10 may be performed by a computing device that is a user device (e.g., a smart television, a tablet, a smart phone, a gateway) executing an application (e.g., associated with a streaming service and/or other type of content delivery service) that is configured to receive (from one or more sources) and output (or cause output of) content and descriptive data. Also or alternatively, one, some, or all steps of the example method of FIG. 10 may be performed by one or more other computing devices. For example, one, some, or all of the steps of the method of FIG. 10 may be performed by a server (e.g., the descriptive data management server 140), and one or more method steps described below may be modified (e.g., content and/or descriptive data described below as received may be sent) based performance of such steps remote computing device. One or more steps of the example method of FIG. 10, and/or one or more communications described in connection with the method of FIG. 10, may be rearranged (e.g., performed, sent, or received in a different order), omitted, and/or otherwise modified, and/or other steps and/or communications added. A communication described in connection with the example method of FIG. 10 need not be a single message nor contained in a single packet, block, or other transmission unit.

At step 1001, a user device may receive an indication of a user preference, for example, to prevent spoilers. The user preference may comprise settings such as hiding descriptive data that may reveal future plot points, displaying only character backgrounds and scene settings relevant to the current segment, delaying the display of upcoming episode summaries until the user has finished the current episode, suppressing notifications and previews that may contain spoilers, and/or any other customization options that may help enhance the viewing experience. For example, a user viewing a series may enable the settings to receive only information pertinent to the current episode, avoiding unintended spoilers.

At step 1002, the user device may receive content that may be divided into multiple segments (e.g., content segments), each of which may be accessed (or output) sequentially. For example, the content may comprise a plurality of sequentially output-able content segments. The content segments may comprise timestamps. Additionally, the user device may receive descriptive data.

The descriptive data may comprise a plurality of descriptive data segments. Furthermore, each descriptive data segment, of the plurality of descriptive data segments, may be associated with a content segment of the plurality of content segments. Each descriptive data segment may comprise information regarding one or more content segments, of the plurality of content segments, that may precede that associated segments.

For example, the descriptive data may comprise descriptive data generated by a creator of the content and descriptive data from a third-party source. The descriptive data may comprise crowdsource information. The descriptive data segments may comprise timestamps. The descriptive data may comprise segments formatted in Extensible Markup Language (XML). Additionally or alternatively, the descriptive data segments may comprise descriptive data segments formatted in XML.

For example, each descriptive data segment, of the plurality of descriptive data segments, may comprise one or more of: information regarding narrative elements of the one or more content segments, of the plurality of content segments, that may precede that associated content segment; performance details of the one or more content segments, of the plurality of content segments, that may precede that associated content segment; production attributes of the one or more content segments, of the plurality of content segments, that may precede that associated content segment; and/or other type(s) of descriptive data information described herein.

The descriptive data may comprise a plurality of descriptive data topics. Furthermore, each descriptive data topic, of the plurality of descriptive data topics, may be associated with a content segment of the plurality of content segments. Each descriptive data topic may comprise information regarding one or more content segments, of the plurality of content segments, that may precede that associated segments.

For example, each descriptive data topic, of the plurality of descriptive data topics, may comprise one or more of: character backgrounds introduced in the respective content segments and one or more preceding content segments; plot summaries of the respective content segments and one or more preceding content segments; thematic elements of the respective content segments and one or more preceding content segments; and/or other type(s) of descriptive data information described herein.

For example, the user device may receive, with the content and from a first source (e.g., a creator of the content, etc.), a first portion of the descriptive data associated with a creator of the content. Additionally, the user device may receive, from a second source (e.g., third-party source, etc.), a second portion of the descriptive data. For example, the third-party source may comprise one or more streaming services. The streaming services may allow a user to access video/audio content in real-time over the internet.

The user device may receive, with the content and from a first source (e.g., a creator of the content, etc.), a first portion of the descriptive data associated with a creator of the content. Additionally or alternatively, the user device may receive, from a second source, a second portion of the descriptive data associated with crowdsource information from consumers of the content.

At step 1003, the user device may receive, during output of the content, a request to allow access to (or output) the descriptive data. For example, during the output of the content, the user device may receive user requests to access additional information from descriptive data associated with the content being viewed. The request may enable the user device to display relevant descriptive data, such as detailed descriptions, supplementary materials, background information, and/or any other relevant information. Additionally or alternatively, the user device may receive, during output of the content, a request for a descriptive data topic.

At step 1004, the user device may allow access to a first descriptive data segment, of the plurality of descriptive data segments, that may be associated with the first content segment. For example, the user device may output, with a first content segment of the plurality of content segments, information from a first descriptive data segment, of the plurality of descriptive data segments, that may be associated with the first content segment. For example, if a user views content (e.g., a movie, etc.), as a first segment of the content may begin to be output, the user device may allow access to descriptive data information associated with the first segment of the content. For example, the user device may allow access to the descriptive data information associated with the first segment of the content, for example, based on a timestamp of the first content segment corresponding to a timestamp of the first descriptive data segment.

For example, the user device may allow access to (or output) the descriptive data information associated with the first segment of the content, for example, based on output content segments, of the plurality of content segments, that may precede the first content segment. For example, the user device may allow access to (or output) the descriptive data information associated with the first segment of the content, for example, at its regular speed, without allowing fast-forwarding (FF) and/or using any playback manipulation features (e.g., skipping or speeding up the content, etc.). This may help ensure that the user has genuinely viewed the content in its entirety until a second descriptive data segment associated with a second segment of the content may be output.

For example, the user device may allow access to (or output) the information, for example, based on a viewing history that may be associated with a user. For example, if a user frequently views science fiction movies and has previously viewed several movies in this genre, the user device may build a viewing history (e.g., viewing history profile) for the user. This history may comprise details such as the titles of watched movies, genres, duration of viewing, user ratings, and/or any other relevant information that may help personalize the user's experience. Based on the viewing history associated with the user, if the user starts viewing a new science fiction movie, the user device may allow access to (or output) descriptive data segments relevant to the user's preferences.

The user device may determine content segments, of the plurality of content segments, that have been output, for example, based on the request. Based on the determination, the user device may provide relevant descriptive data and/or additional information that may be associated with the content segments already viewed by the user.

The user device may allow access to (or output), based on the request and with one or more content segments, of the plurality of content segments, that may follow the determined content segments, information from one or more descriptive data segments, of the plurality of descriptive data segments, that may be associated with one or more of the determined content segments. For example, if a user views content (e.g., a series of episodes, etc.) and requests, to the user device, more information about, for example, one or more previous episodes that have already been viewed, the user device may output descriptive data associated with the one or more previous episodes (e.g., detailed summaries, or behind-the-scenes facts for the one or more previous episodes, etc., to name a few non-limiting examples).

The user device may allow access to (or output) information from one or more descriptive data segments, of the plurality of descriptive data segments, that may be associated with the one or more subsequent content segments, for example, based on the request and after output of one or more subsequent content segments, of the plurality of content segments, that may follow the determined content segments. For example, if a user requests information and has viewed a particular content segment of content (e.g., a movie, etc.), the user device may wait until one or more subsequent content segments of the content (e.g., the movie, etc.) have been played before outputting descriptive data information associated with the one or more subsequent content segments. For example, if a user may view content (e.g., a movie, etc.) on a user device and may finish viewing a first content segment of the content (e.g., first scene), the user may request additional information about, for example, what happens next, etc., to name a few non-limiting examples. If the user device may allow access to (or output) a second content segment of the content (e.g., second scene), the user device may allow access to (or output) descriptive data associated with the second content segment of the content (e.g., second scene) (e.g., a summary of the upcoming scene, behind-the-scenes facts, etc. to name a few non-limiting examples).

At step 1005, the user device may prevent access to a second descriptive data segment that may be associated with a content segment (e.g., second content segment) that may follow the first content segment. For example, the user device may prevent, until output of a second content segment, of the plurality of content segments, that is after the first content segment, information from a second descriptive data segment, of the plurality of descriptive data segments, that may be associated with the second content segment. Additionally or alternatively, based on the user preference, the user device may prevent, until output of a second content segment, of the plurality of content segments, that is after the first content segment, information from a second descriptive data segment, of the plurality of descriptive data segments, that may be associated with the second content segment. For example, if the user views content on the user device, the user device may allow access to (or output) descriptive data associated with the first content segment (e.g., character backgrounds, or scene settings, etc., to name a few non-limiting examples) with the first content segment of the content.

The user device may prevent, until output of a second content segment, of the plurality of content segments, information from a second descriptive data segment, of the plurality of descriptive data segments, associated with the second content segment, for example, based on the user preference and based on the request. For example, if a user may view content (e.g., a movie) on a user device and may have enabled, for example, a "Prevent Spoilers" setting, the user device may allow access to (or output) descriptive data that may be associated with a first content segment of the content (e.g., first scene, etc.) while the first content segment of the content (e.g., first scene, etc.) may be being viewed. Information about a second descriptive data segment (e.g., key plot twists, or the identity of the antagonist, etc. to name a few non-limiting examples), which may be associated with a second content segment of the content (e.g., second scene, etc.), may be withheld until the second content segment of the content (e.g., second scene, etc.) may begin. This approach may help prevent important details from being revealed prematurely, enhancing the overall viewing experience.

Additionally, after the first segment of the content, the user device may withhold information about a second descriptive data segment (e.g., plot twist, or identity of an antagonist, etc., to name a few non-limiting examples) that may be associated with the second content segment, until the user reaches the second content segment of the content (e.g., the movie, etc.). For example, based on timestamps of content segments, of the plurality of content segments and that may precede the second content segment, lacking timestamps that may correspond to a timestamp of the second descriptive data segment, the user device may prevent, until output of a second content segment, of the plurality of content segments, that is after the first content segment, information from a second descriptive data segment, of the plurality of descriptive data segments, that may be associated with the second content segment. For example, the user device may prevent, until output of content segments, of the plurality of content segments and that may precede the second content segment, output of the information from the second descriptive data segment. For example, based on the viewing history associated with a user, the user device may not allow access to (or output) information, from a third descriptive data segment, of the plurality of descriptive data segments, associated with the first content segment.

Additionally or alternatively, based on receiving the request for a descriptive data topic, the user device may determine whether content segments associated with the descriptive data topic have been output. For example, each descriptive data topic, of the plurality of descriptive data topics, may comprise one or more of: information associated with character backgrounds that may be introduced in the respective content segments and one or more preceding content segments; plot summaries of the respective content segments and one or more preceding content segments; information associated with thematic elements of the respective content segments and one or more preceding content segments; and/or other type(s) of descriptive data information described herein. The user device may prevent access to the descriptive data topic associated with subsequent content segments, for example, if the content segments associated with the descriptive data topic have not been output.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, by a computing device, content and descriptive data, wherein the content comprises a plurality of content segments, wherein the descriptive data comprises a plurality of descriptive data segments associated with a respective content segment and comprises information regarding the respective content segments and one or more preceding content segments;

determining, during output of the content, a first level of engagement of a user with a first content segment of the plurality of content segments and a second level of engagement of the user with a second content segment of the plurality of content segments;

allowing, based on the first level of engagement, access to a first descriptive data segment associated with the first content segment and one or more preceding content segments; and preventing, based on the second level of engagement, access to a second descriptive data segment associated with the second content segment that follows the first content segment.

2. The method of claim 1, wherein the descriptive data segments comprise timestamps, wherein the allowing access to the first descriptive data segment is based on a timestamp of the first content segment corresponding to a timestamp of the first descriptive data segment, and wherein the preventing access to the second descriptive data segment is based on timestamps of content segments, of the plurality of content segments and that precede the second content segment, lacking timestamps that correspond to a timestamp of the second descriptive data segment.

3. The method of claim 1, wherein the allowing access to the first descriptive data segment is further based on output of content segments, of the plurality of content segments, that precede the first content segment, and wherein the preventing access to the second descriptive data segment comprises preventing, until output of content segments, of the plurality of content segments and that precede the second content segment, output of the information from the second descriptive data segment.

4. The method of claim 1, wherein the allowing access to the first descriptive data segment is based on a viewing history associated with a user, and wherein the preventing access to the second descriptive data segment comprises:

based on the viewing history associated with a user, not allowing access to information, from a third descriptive data segment, of the plurality of descriptive data segments, associated with the first content segment.

5. The method of claim 1, further comprising:

receiving, during output of the content, a request to allow access to the descriptive data; and determining, based on the request, content segments, of the plurality of content segments, that have been output, wherein the allowing access to the first descriptive data segment comprises allowing, based on the request and with access to one or more content segments, of the plurality of content segments, that follow the determined content segments, access to one or more descriptive data segments, of the plurality of descriptive data segments, associated with one or more of the determined content segments.

6. The method of claim 1, further comprising:

receiving, by the computing device, an indication of a user preference to prevent spoilers, wherein the preventing access to the second descriptive data segment is based on the user preference.

7. The method of claim 1, wherein the determining the second level of engagement is based on one or more user inputs associated with the second content segment.

8. The method of claim 1, wherein the receiving comprises:

receiving, with the content and from a first source, a first portion of the descriptive data associated with a creator of the content; and receiving, from a second source, a second portion of the descriptive data associated with crowdsource information from consumers of the content.

9. The method of claim 1, wherein the descriptive data comprises descriptive data generated by a creator of the content and descriptive data from a third-party source.

10. The method of claim 1, wherein the descriptive data comprises crowdsource information.

11. The method of claim 1, wherein the determining the second level of engagement comprises determining that the second content segment was output in a background playback mode.

12. A method comprising:

receiving, by a computing device, content and descriptive data, wherein the content comprises a plurality of content segments, wherein the descriptive data comprises a plurality of descriptive data topics associated with a respective content segment and comprises information regarding the respective content segment and one or more preceding content segments;

receiving, during output of the content, a request for a descriptive data topic;

determining a history corresponding to the content that indicates, for one or more previous instances of output of the content, a level of engagement for each of the plurality of content segments; and based on the history, preventing access to the descriptive data topic associated with subsequent content segments.

13. The method of claim 12, wherein the determining the history comprises determining, based on one or more user inputs associated with the subsequent content segments, one or more levels of engagement of the subsequent content segments.

14. The method of claim 12, wherein the descriptive data comprises descriptive data generated by a creator of the content and descriptive data from a third-party source.

15. The method of claim 12, wherein the descriptive data comprises crowdsource information.

16. The method of claim 12, wherein the determining the history comprises determining that the subsequent content segments were output in a background playback mode.

17. A method comprising:

receiving, by a computing device, an indication of a user preference to prevent spoilers;

receiving, during output of a first content segment of a plurality of sequential content segments of content, a request for content descriptive data, wherein:

the plurality of sequential content segments comprises the first content segment and one or more second content segments, the descriptive data comprises a plurality of descriptive data segments, and each descriptive data segment is associated with a content segment and comprises information regarding the associated content segment and one or more of preceding content segments;

determining a history corresponding to the content that indicates, for one or more previous instances of output of the content, a level of engagement for each of the plurality of sequential content segments; and based on the user preference and the history, preventing access to descriptive data segments associated with the one or more second content segments until output for presentation of the one or more second content segments.

18. The method of claim 17, wherein the determining the history comprises determining, based on one or more user inputs associated with the one or more second content segments, one or more levels of engagement.

19. The method of claim 17, wherein the descriptive data comprises descriptive data generated by a creator of the content and descriptive data from a third-party source.

20. The method of claim 17, wherein the descriptive data comprises crowdsource information.

* * * * *